United States Patent
Fuchigami

(10) Patent No.: US 8,750,622 B2
(45) Date of Patent: Jun. 10, 2014

(54) IMAGE PROCESSING DEVICE AND IMAGE PROCESSING METHOD

(75) Inventor: Ikuo Fuchigami, Fukuoka (JP)

(73) Assignee: Panasonic Corporation, Osaka (JP)

( * ) Notice: Subject to any disclaimer, the term of this patent is extended or adjusted under 35 U.S.C. 154(b) by 37 days.

(21) Appl. No.: 13/641,555

(22) PCT Filed: Apr. 5, 2012

(86) PCT No.: PCT/JP2012/002399
§ 371 (c)(1),
(2), (4) Date: Oct. 16, 2012

(87) PCT Pub. No.: WO2012/137511
PCT Pub. Date: Oct. 11, 2012

(65) Prior Publication Data
US 2013/0039586 A1    Feb. 14, 2013

(30) Foreign Application Priority Data
Apr. 7, 2011    (JP) .................................. 2011-085153

(51) Int. Cl.
*G06K 9/48*    (2006.01)

(52) U.S. Cl.
USPC ........................................................ 382/199

(58) Field of Classification Search
None
See application file for complete search history.

(56) References Cited

U.S. PATENT DOCUMENTS

| 5,734,743 | A | 3/1998 | Matsugu et al. | |
|---|---|---|---|---|
| 7,876,954 | B2 * | 1/2011 | Kim et al. | 382/154 |
| 8,284,239 | B2 * | 10/2012 | Chiu et al. | 348/47 |
| 2002/0080135 | A1 | 6/2002 | Sakakibara | |

FOREIGN PATENT DOCUMENTS

| JP | 8-29126 | 2/1996 |
|---|---|---|
| JP | 2001-82954 | 3/2001 |
| JP | 2002-197443 | 7/2002 |

OTHER PUBLICATIONS

International Search Report issued Jul. 3, 2012 in International (PCT) Application No. PCT/JP2012/002399.
Kensaku Yamashita et al., "Vehicle Detection Algorithm Using Three-Dimensional Information and Its VLSI Architecture", The Institute of Electronics, Information and Communication Engineers, IEICE Technical Report, vol. 107, No. 287, ICD 2007-99, pp. 5-9, Oct. 2007 along with partial English translation and Verification of Translation.

* cited by examiner

*Primary Examiner* — Daniel Mariam
(74) *Attorney, Agent, or Firm* — Wenderoth, Lind & Ponack, L.L.P.

(57) ABSTRACT

Provided are an image processing device and an image processing method for generating a disparity image from a first image and a second image. A vertical edge extraction unit detects vertical edges in the first image, and a horizontal segmentation unit divides a horizontal line in the first image into a plurality of segments using the detected edges as borders between the segments. A disparity search unit calculates, for each of the segments, a disparity between the segment and a region of the second image similar to the segment, and a disparity image generation unit generates the disparity image in accordance with the disparity calculated for each of the segments.

10 Claims, 11 Drawing Sheets

| -1 | 0 | 1 |
| --- | --- | --- |
| -1 | 0 | 1 |
| -1 | 0 | 1 |

1102

| 0 | 0 | 0 |
| --- | --- | --- |
| -1 | 0 | 1 |
| 0 | 0 | 0 |

1103

| 0 | 0 | 0 |
| --- | --- | --- |
| 0 | -1 | 1 |
| 0 | 0 | 0 |

1104

| 0 | 0 | 0 |
| --- | --- | --- |
| -1 | 1 | 0 |
| 0 | 0 | 0 |

IMAGE PROCESSING DEVICE AND IMAGE PROCESSING METHOD

TECHNICAL FIELD

The present invention is technology for stereoscopic viewing, and in particular relates to an image processing device and image processing method that generate a disparity image from an image pair of stereo images or the like.

BACKGROUND ART

Conventionally, technology has been proposed for extracting disparity information from a pair of images, such as stereo images, of an object photographed from different locations, and for reconstructing 3D information on the object using the extracted disparity information. During processing to extract disparity information from a pair of images, a method called block matching is often used.

Block matching is a method for calculating the disparity of a target pixel. Given a target block composed of the target pixel and neighboring pixels in one image in a pair of images, this method searches for a corresponding block with similar pixel values in the other image and calculates the disparity of the target pixel to be the disparity between the target block and the corresponding block. In this context, for grayscale images, a pixel value indicates the brightness, and for color images, the pixel value indicates the brightness/color difference or is a value based on a color system such as RGB.

In stereo images, a region may exist in which pixel values greatly differ between the images, such as a region that is concealed by an object in the foreground of one image but appears in the other image. Block matching is processing to search for corresponding blocks using similarity between pixel values, thus making it difficult to search for the corresponding block if a region in which pixel values greatly differ between the images is included in the target block.

Patent Literature 1 proposes technology for solving this problem. In Patent Literature 1, edges are extracted from an image, and the target block is divided along the extracted edges, thereby excluding, from the target block, regions in which pixel values greatly differ. In a region in which pixel values greatly differ between a pair of images, pixel values often differ greatly from other regions within the same image as well. Extracting, from a block, a region in which pixel values greatly differ therefore results in extraction, from the block, of a region in which pixel values greatly differ between images.

CITATION LIST

Patent Literature

Patent Literature 1: Japanese Patent Application Publication No. H08-29126

SUMMARY OF INVENTION

Technical Problem

In terms of performance, such as processing load and the accuracy of disparity calculation, there is a desire for further improvement in matching processing that divides blocks along edges.

Is therefore an object of the present invention to provide an image processing device and an image processing method that improve on the processing load and the accuracy of disparity calculation during matching processing that divides blocks along edges.

Solution to Problem

In order to solve the above problem, an image processing device of the present invention is an image processing device for generating a disparity image from a first image and a second image, comprising: a vertical edge extraction unit configured to calculate a vertical edge component of each pixel in the first image; a horizontal segmentation unit configured to divide a horizontal line in the first image into a plurality of segments using, as a border between each of the segments, a pixel for which the vertical edge component has a magnitude exceeding a predetermined threshold; a disparity calculation unit configured to calculate a disparity between each of the segments and a region of the second image similar to the segment; and a disparity image generation unit configured to generate the disparity image in accordance with the disparity calculated for each of the segments.

Advantageous Effects of Invention

The image processing device of the present invention achieves the advantageous effects of accurate disparity calculation and of controlling an increase in the processing load during matching processing that divides segments along edges.

BRIEF DESCRIPTION OF DRAWINGS

FIG. 11 illustrates an example of vertical edge extraction filters that can be used in the present invention.

DESCRIPTION OF EMBODIMENTS

Figure 1:
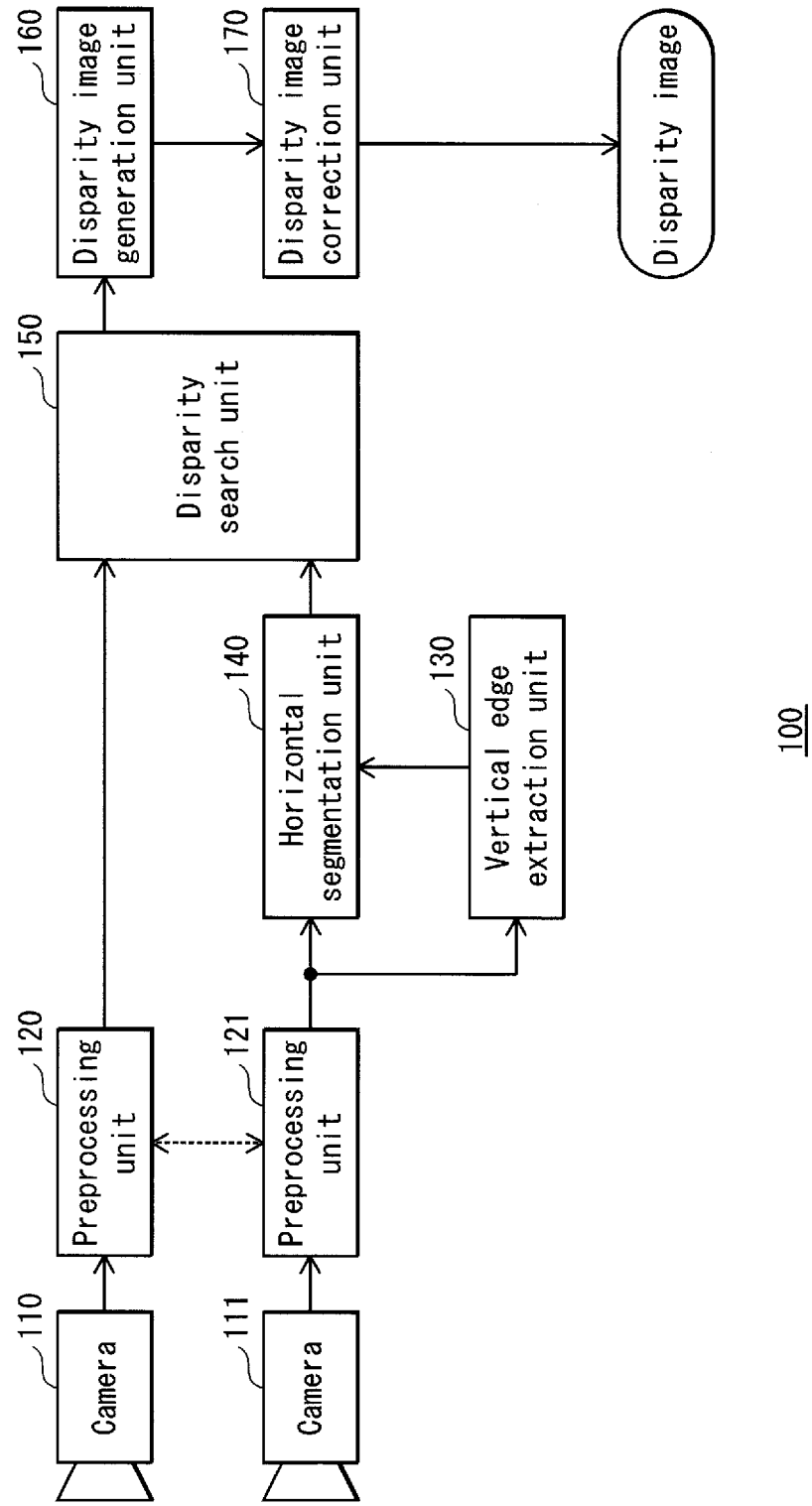
FIG. 1 illustrates an example of the functional structure of an image processing device in Embodiment 1 of the present invention.

Discovery Serving as a Basis for the Present Invention

As a result of intense study, the inventors discovered the following problem with regard to matching processing that divides blocks along edges.

Block Shape and Processing Load

Edges in an image come in a variety of shapes, and dividing a block along edges leads to a complex block shape. During matching processing, in order to calculate the similarity between blocks, it is necessary to acquire pixel values of pixels within the block. If the block shape is complex, however, acquiring the pixel values of pixels within the block becomes complicated.

In greater detail, the problem is as follows. Pixel values for pixels within a block can be acquired all at once before division by specifying a range. After division, however, the block becomes complex, making it necessary to acquire pixels by distinguishing between pixels that do and do not belong to the block. In other words, when the block becomes complex, additional processing becomes necessary to distinguish between pixels that do and do not belong to the block.

The processing to distinguish between pixels that do and do not belong to the block is one reason for an increase in the overall processing load during block matching.

Redundancy of Matching by Edge Segmentation

An edge is an outline of an image in an object. Accordingly, when dividing a target block along edges, pixels belonging to the target block are highly likely to pertain to the same object.

A characteristic of objects within images is that differences in depth do not usually appear within an object. As a result, nearly identical disparity is calculated from pixels rendering the same object.

Accordingly, a structure that performs block matching individually for all pixels in an image may become redundant, performing processing with little result.

Threshold for Edge Magnitude

During edge detection, the brightness gradient of each pixel in the image is normally calculated, and the absolute value is set as the edge magnitude. In terms of edge magnitude, the outlines of objects, for example, tend to be calculated as strong edges with a high edge magnitude, and irregularities, patterns, and the like on an object surface tend to be calculated as weak edges with a low edge magnitude.

When dividing blocks along edges, a threshold is set for the edge magnitude in order to distinguish between edges used for division into blocks and edges not used for division. The threshold for the edge magnitude is set to allow for detection of necessary edges (for example, edges along the border between a region in which pixel values differ greatly between a pair of images and a region without such a difference).

Depending on the image, however, the distribution of the calculated edge magnitude varies, and the distribution of edge magnitude may be biased even within an image. In the case of such a distribution, it is difficult to know in advance where the necessary edges are located. As a result, it becomes difficult to set the optimal threshold for the edge magnitude.

During block matching, matching accuracy is influenced by block size. For example, if the block size is small, disparity can be calculated to a high degree of resolution, but disparity errors become frequent due to the influence of noise and the difficulty in distinguishing regions from other regions with similar pixel values. Conversely, a large block size reduces disparity error, yet makes it difficult to accurately calculate the correspondence between small regions.

When dividing blocks along edges, the block size after division is influenced by the threshold for edge magnitude used for identifying the edges for division. In other words, when using a high value for the threshold for identifying the edges for division, blocks are divided only by strong edges, yielding a relatively large block size. When using a low value for the threshold, blocks are divided also by weak edges, yielding a relatively small block size.

For this reason, the threshold for edge magnitude also influences matching accuracy, making it even more difficult to set an appropriate threshold.

Based on the above discovery, the inventors conceived of the invention described below. The following describes embodiments of the present invention with reference to the figures.

1. Embodiment 1

1.1 Structure

First, the structure of an image processing device according to the present invention is described. FIG. 1 is a functional configuration diagram of an image processing device 100 according to the present embodiment. As illustrated in FIG. 1, the image processing device 100 is provided with a camera 110, a camera 111, a preprocessing unit 120, a preprocessing unit 121, a vertical edge extraction unit 130, a horizontal segmentation unit 140, a disparity calculation unit 150, a disparity image generation unit 160, and a disparity correction unit 170.

The camera 110 and the camera 111 are stereo cameras that generate a pair of stereo images by photographing an object from different positions at the same time.

Figure 2:
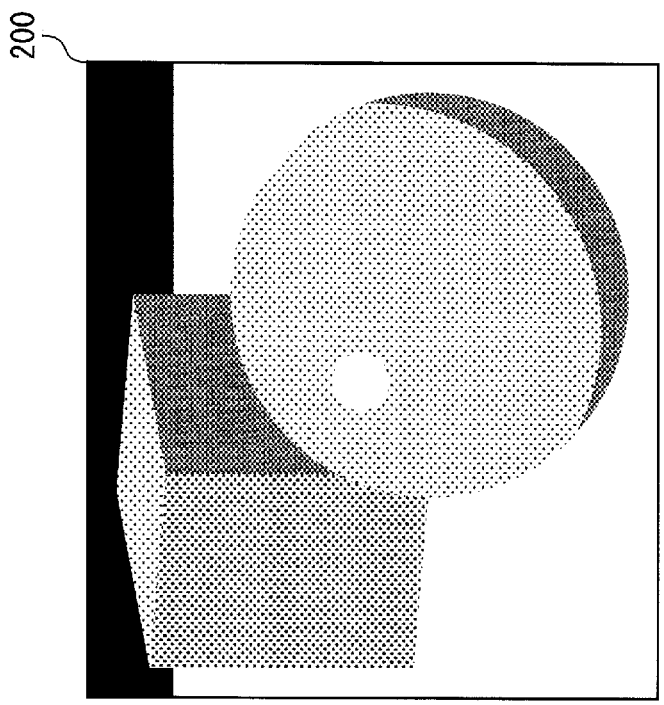
FIG. 2 illustrates an example of stereo images that have been preprocessed by preprocessing units in Embodiment 1 of the present invention.
Figure 2:
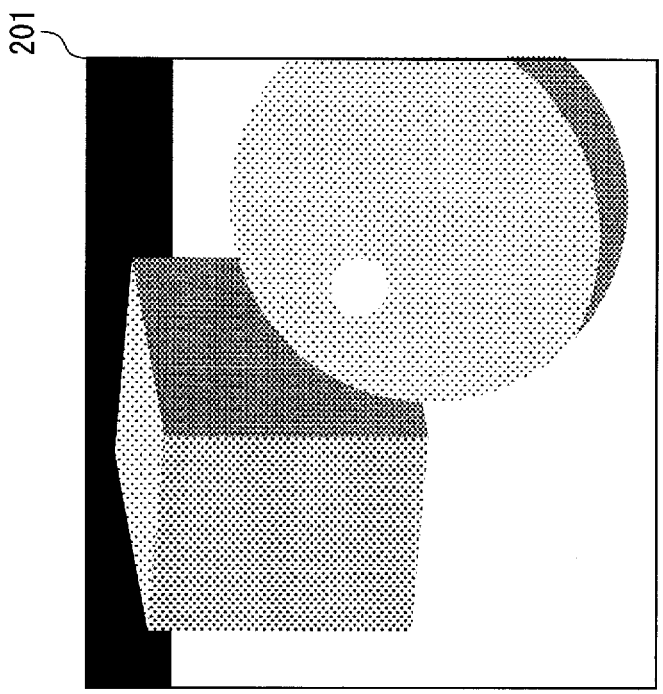

The preprocessing unit 120 and the preprocessing unit 121 perform preprocessing, such as distortion correction, stereo rectification (rectification of the epipolar line in terms of epipolar geometry), and the like on the stereo images generated by the camera 110 and the camera 111. FIG. 2 shows stereo images that have been preprocessed by the preprocessing units 120 and 121. In FIG. 2, an image 200 has been photographed by the camera 110 and preprocessed by the preprocessing unit 120, whereas an image 201 has been photographed by the camera 111 and preprocessed by the preprocessing unit 121.

The vertical edge extraction unit 130 in FIG. 1 extracts vertical edges from the image 201 preprocessed by the preprocessing unit 121. Specifically, the vertical edge extraction unit 130 applies a horizontal Sobel filter to the image 201, seeks the horizontal brightness gradient for each pixel, and calculates the absolute value as the vertical edge magnitude.

Figure 3:
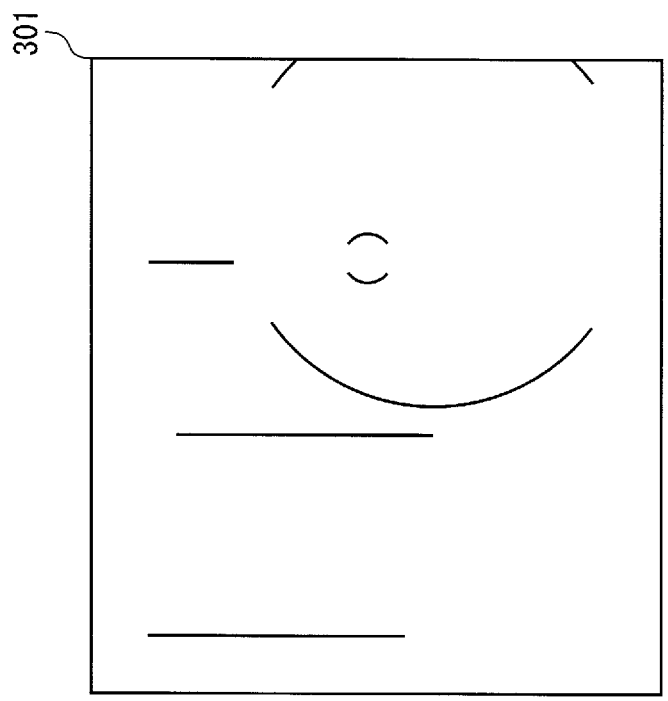
FIG. 3 illustrates an example of a Sobel filter for extracting vertical edges and an example of extracted vertical edges in Embodiment 1 of the present invention.

A filter 300 in FIG. 3 schematically illustrates a horizontal Sobel filter. A Sobel filter multiplies nine pixels, centered on a target pixel, by the coefficients shown in FIG. 3, calculating the sum of the result of multiplication.

Edges extracted by filtering may have a width extending over a plurality of pixels. Therefore, the vertical edge extraction unit 130 performs thinning by detecting a horizontal peak among the calculated vertical edge magnitudes (the position of a pixel with a higher vertical edge magnitude than a neighboring pixel) and conserving only the vertical edge magnitude at the peak, setting all other vertical edge magnitudes to zero.

An image 301 in FIG. 3 illustrates an example in which vertical edges have been extracted from the image 201 and thinned. Note that for the sake of explanation, this figure shows the vertical edges extracted from all pixels in the image 201. In the present embodiment, the vertical edge extraction unit 130 extracts vertical edges from the image 201 one horizontal line at a time.

The horizontal segmentation unit 140 in FIG. 1 divides the horizontal lines in the image 201, which has been preprocessed by the preprocessing unit 121, using the vertical edge magnitudes calculated by the vertical edge extraction unit 130. Specifically, the horizontal segmentation unit 140 divides a horizontal line into a plurality of horizontal segments, taking a pixel whose vertical edge magnitude exceeds a predetermined threshold to be a border. Furthermore, the horizontal segmentation unit 140 performs the above division into horizontal segments using a plurality of thresholds to hierarchize the horizontal segments.

The division of horizontal lines into horizontal segments and the hierarchizing of horizontal segments by the horizontal segmentation unit 140 are described in detail with reference to FIGS. 4A and 4B.

Figure 4A:
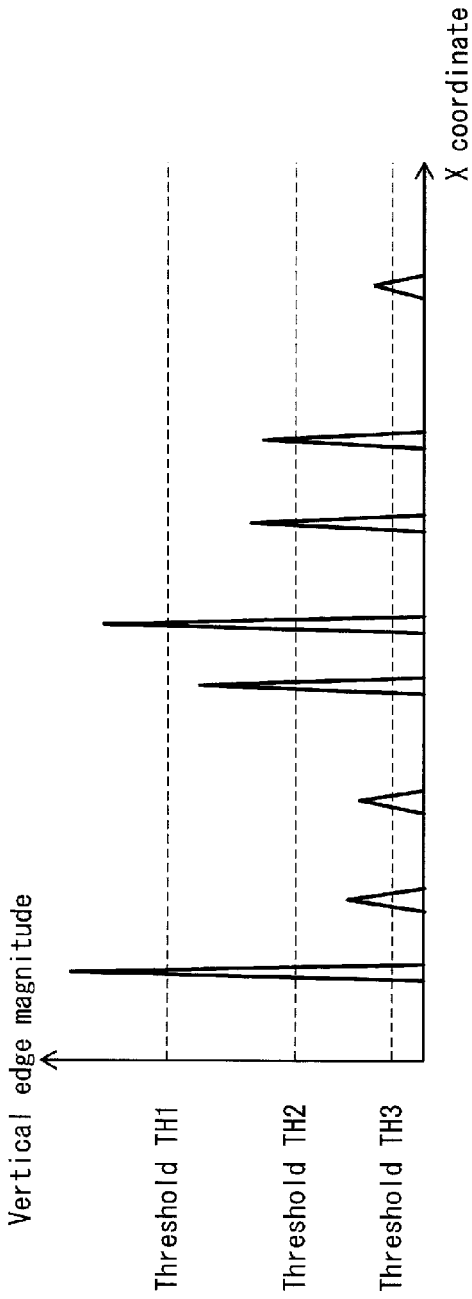
FIGS. 4A and 4B illustrate segmentation of a horizontal line into horizontal segments and hierarchizing of the horizontal segments in Embodiment 1 of the present invention.

FIG. 4A is a graph showing vertical edge magnitude of horizontal lines targeted for processing in the image 201 after thinning by the vertical edge extraction unit 130. The horizontal axis represents the X coordinate in the image 201, and the vertical axis represents the calculated vertical edge magnitude. As shown in FIG. 4A, after thinning, values among the vertical edge magnitudes other than extreme values are adjusted to zero, clearly revealing the locations of edges. Note that the thresholds Th1, Th2, and Th3 are a plurality of thresholds used during division.

Figure 4B:
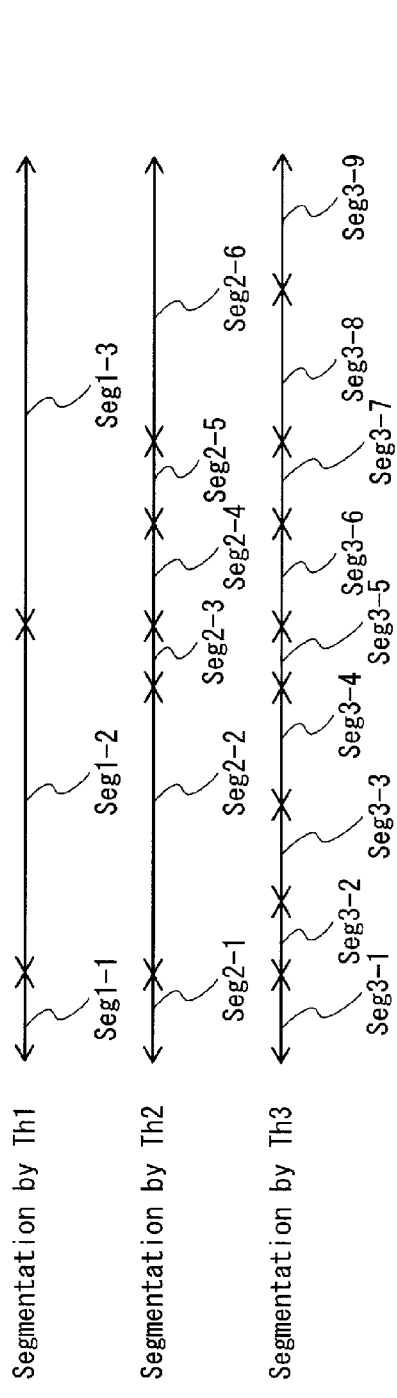

FIG. 4B schematically illustrates division of horizontal lines targeted for processing in the image 201 using the plurality of thresholds. In the example in FIG. 4B, using the threshold Th1 divides the horizontal line targeted for processing into three horizontal segments: seg 1-1, seg 1-2, and seg 1-3. Using the threshold Th2 divides the horizontal line targeted for processing into six horizontal segments: seg 2-1, seg 2-2, seg 2-3, seg 2-4, seg 2-5, and seg 2-6. Furthermore, using the threshold Th3 divides the horizontal line targeted for processing into nine horizontal segments, seg 3-1 through seg 3-9. In the present embodiment, pixels acting as the border for division are assigned to one of the segments on either side in a fixed way.

Since edges that exceed the threshold Th2, which is smaller than the threshold Th1, include edges that exceed the threshold Th1, the horizontal segments resulting from division by the threshold Th2 are divided further than the horizontal segments resulting from division by the threshold Th1. For example, seg 2-2 and seg 2-3 yielded during division by the threshold Th2 are horizontal segments resulting from further division of seg 1-2 yielded during division by the threshold Th1. The relationship between horizontal segments resulting from division by the threshold Th2 and the threshold Th3 exhibit a similar relationship.

When dividing in this way using a plurality of thresholds, the horizontal segments resulting from division form a hierarchy. Accordingly, in the present description, dividing a horizontal line into horizontal segments using a plurality of thresholds is referred to as hierarchizing the horizontal segments. Horizontal segments yielded by division using a larger threshold are considered to be higher in the hierarchy, whereas horizontal segments yielded by division using a smaller threshold are considered to be lower in the hierarchy.

The horizontal segmentation unit 140 generates segment data and outputs the segment data to the disparity search unit 150. The segment data indicates, for each horizontal segment resulting from division, the following in association: the position of the segment (X coordinate and Y coordinate), the segment size, and the pixel value of each pixel belonging to the segment.

For each piece of segment data input from the horizontal segmentation unit 140, the disparity search unit 150 of FIG. 1 detects a similar region in the image 200 input from the preprocessing unit 120, and calculates the disparity and the degree of similarity with the detected region.

In the present embodiment, SAD (Sum of Absolute Differences) is used during detection of similar regions. SAD is often used in block matching. SAD is an index indicating the similarity between two groups. As the value of the SAD decreases, the two groups can be considered to be more similar.

Letting the horizontal segment input from the horizontal segmentation unit 140 be segment i (x coordinate: $x_i$, y coordinate: $y_i$, segment size: N), the SAD between segment i and a region corresponding to disparity amount d in the image 200 is given by Equation 1 below.

$$SAD_i(d) = \sum_{j=x_i}^{x_i+N-1} |I_L(j, y_i) - I_R(j+d, y_i)| \quad \text{Equation 1}$$

In Equation 1, $I_L(x, y)$ indicates the pixel value at coordinates (x, y) in the image 201, and $I_R(x, y)$ indicates the pixel value at coordinates (x, y) in the image 200.

The disparity search unit 150 changes the disparity amount d in a predetermined search range, detects the disparity amount d yielding the smallest SAD, and sets the detective disparity amount d to be the disparity $D_i$ of segment i.

Figure 5:
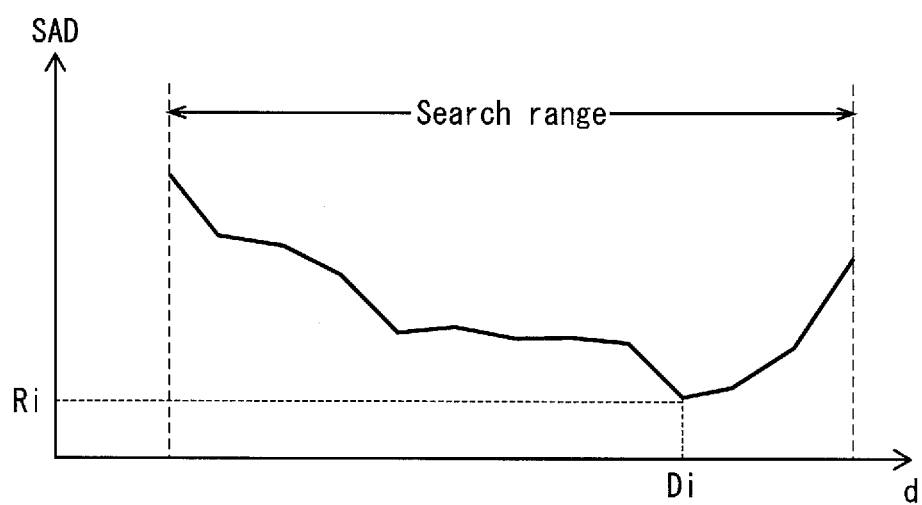
FIG. 5 is a graph illustrating the SAD calculated by converting the disparity amount within a search range in Embodiment 1 of the present invention.

FIG. 5 is an example of a graph showing the SAD calculated by changing the disparity d within the search range. In FIG. 5, $R_i$ is the minimum value of SAD in the search range and is provided by Equation 2 below.

$$R_i = \min[SAD_i(d)] \quad \text{Equation 2}$$
$$= \min\left[\sum_{j=x_i}^{x_i+N-1} |I_L(j, y_i) - I_R(j+d, y_i)|\right]$$

$R_i$ is the value of the above index of similarity. Since this value depends on the segment size, it cannot be directly compared with the value of another segment of a different size. In order to compare values between segments of different sizes, it is necessary to compare values of $R_i$ that have been normalized by the segment size N.

Therefore, the disparity search unit 150 calculates the similarity $S_i$ between segment i and the detected region using Equation 3 below.

$$S_i = \frac{1}{R_i/N + 1} \quad \text{Equation 3}$$

Note that in Equation 3, the similarity $S_i$ is set to the inverse of $R_i$ normalized by the segment size N, so that as the similarity between the segment i and the detected region increases, the value of the similarity $S_i$ increases.

Upon calculating the disparity and similarity of the segment, the disparity search unit 150 generates disparity data associating the segment position, segment size, disparity, and similarity, outputting the disparity data to the disparity image generation unit 160.

Figure 6:
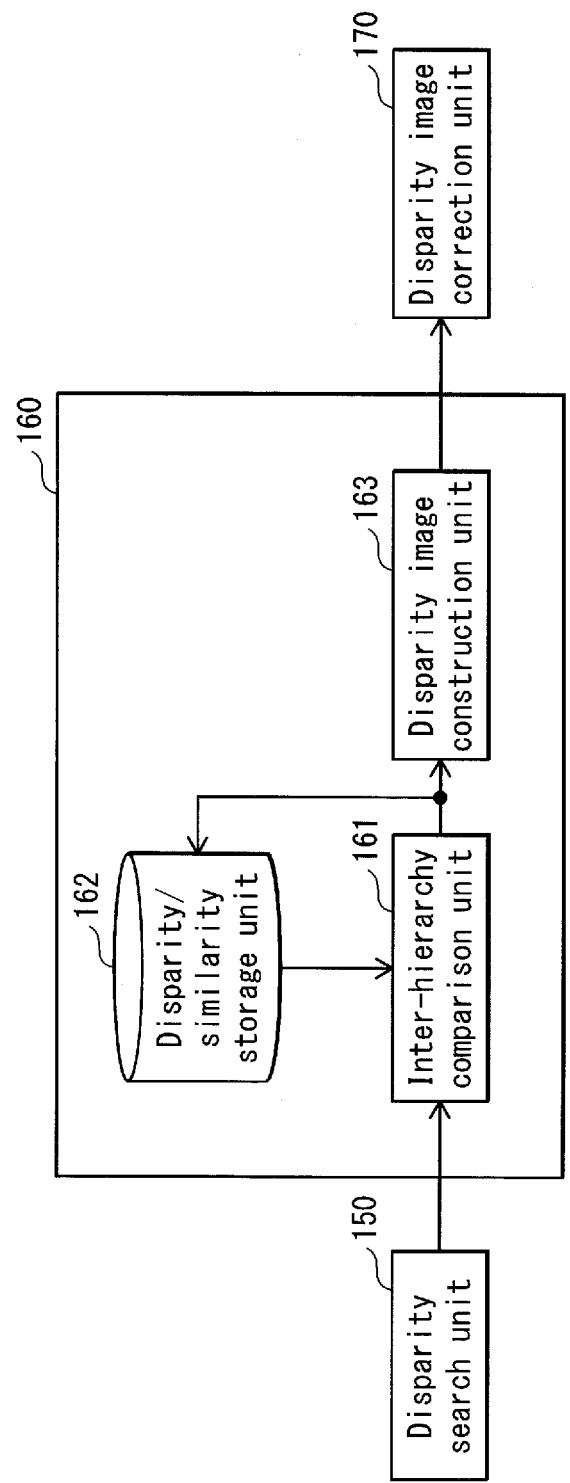
FIG. 6 illustrates the internal structure of a disparity image generation unit in Embodiment 1 of the present invention.

FIG. 6 illustrates the internal configuration of the disparity image generation unit 160 of FIG. 1. As shown in FIG. 6, the disparity image generation unit 160 is internally provided with an inter-hierarchy comparison unit 161, a disparity/similarity storage unit 162, and a disparity image construction unit 163.

If the disparity data input from the disparity search unit 150 is for the uppermost horizontal segment in the hierarchy, the inter-hierarchy comparison unit 161 does not update the disparity data, but rather outputs the disparity data directly to the disparity/similarity storage unit 162 and the disparity image construction unit 163.

If the disparity data input from the disparity search unit 150 is not for the uppermost horizontal segment in the hierarchy, the inter-hierarchy comparison unit 161 performs the inter-hierarchy comparison described below and outputs the resulting disparity data to the disparity/similarity storage unit 162 and the disparity image construction unit 163. At this point, the disparity data for the horizontal segment that is one level higher in the hierarchy (i.e. the parent segment) than the horizontal segment indicated by the disparity data input from the disparity search unit 150 (i.e. the segment for processing), and that has a region overlapping with the horizontal segment input from the disparity search unit 150, is already stored in the disparity/similarity storage unit 162.

Upon starting the inter-hierarchy comparison, the inter-hierarchy comparison unit 161 acquires disparity data for the parent segment from the disparity/similarity storage unit 162 and then compares the similarity of the parent segment with the similarity of the segment for processing. When the similarity of the parent segment is greater than the similarity of the segment for processing, the inter-hierarchy comparison unit 161 updates the disparity and the similarity in the disparity data of the segment for processing to the disparity and the similarity in the disparity data of the parent segment. The inter-hierarchy comparison unit 161 then outputs the updated disparity data to the disparity/similarity storage unit 162 and the disparity image construction unit 163. When the similarity of the parent segment is equal to or less than the similarity of the segment for processing, the inter-hierarchy comparison unit 161 outputs the disparity data of the segment for processing as is to the disparity/similarity storage unit 162 and the disparity image construction unit 163. This concludes the inter-hierarchy comparison by the inter-hierarchy comparison unit 161.

The disparity/similarity storage unit 162 is a temporary storage area for temporarily storing disparity data input from the inter-hierarchy comparison unit 161.

The disparity image construction unit 163 constructs disparity images in accordance with the disparity data input from the inter-hierarchy comparison unit 161. Specifically, the disparity image construction unit 163 constructs one disparity image by updating the disparity of each pixel, within a storage region (not shown in the figures) storing the disparity of all pixels in the image, that corresponds to the position and segment size indicated by the disparity data. The disparity image construction unit 163 updates the disparity of each corresponding pixel to the disparity indicated by the disparity data.

The disparity image correction unit 170 in FIG. 1 generates a disparity image with noise removed therefrom by performing noise removal, using a noise removal filter that is longer vertically than horizontally, on the disparity image generated by the disparity image generation unit 160. In the present embodiment, a median filter is used as the noise removal filter.

Figure 7:
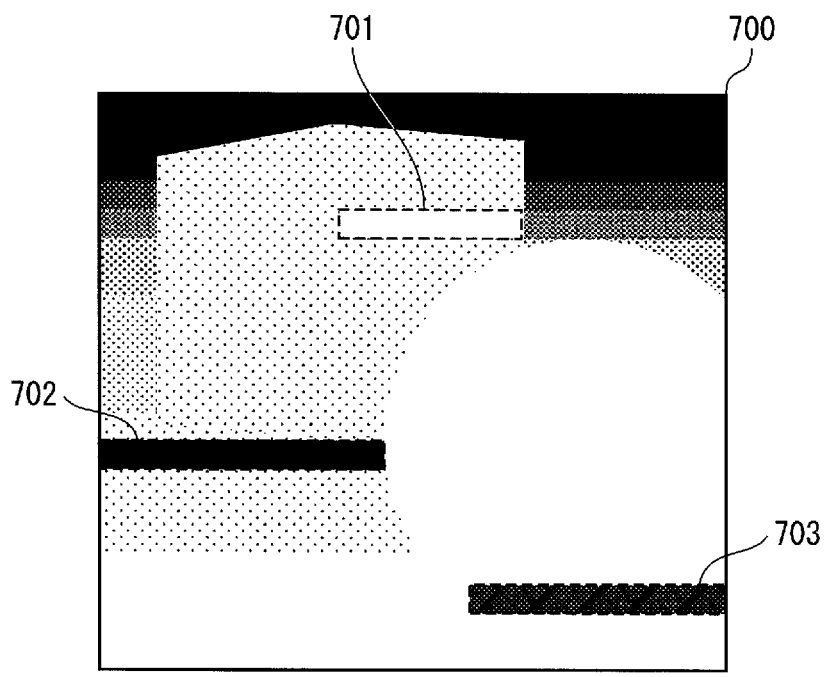
FIG. 7 is an example of a disparity image in Embodiment 1 of the present invention.

FIG. 7 is an example of a disparity image showing regions in which the disparity increases as the color of a region grows lighter. In the disparity image generated by the disparity image generation unit 160, disparity errors occur as a horizontally long horizontal segment, as indicated by the labels 701, 702, and 703 in FIG. 7. Disparity error that is longer horizontally than vertically can effectively be removed by using a noise removal filter that is longer vertically than horizontally, since the proportion of normal pixels (pixels without disparity error) included in the filter window increases.

The function blocks represented by the preprocessing unit 120, the preprocessing unit 121, the vertical edge unit 130, the horizontal segmentation unit 140, the disparity search unit 150, the disparity image structure unit 160, and the disparity image correction unit 170 are achieved by a CPU executing programs stored in a memory. The CPU and the memory are components of the image processing device 100 and are not shown in the figures. With this structure, the image processing device 100 of the present embodiment can generate a disparity image from the image 200 and image 201 photographed respectively by the camera 110 and the camera 111.

1.2 Operations

Next, operations of the image processing device 100 according to the present invention are described.

Figure 8:
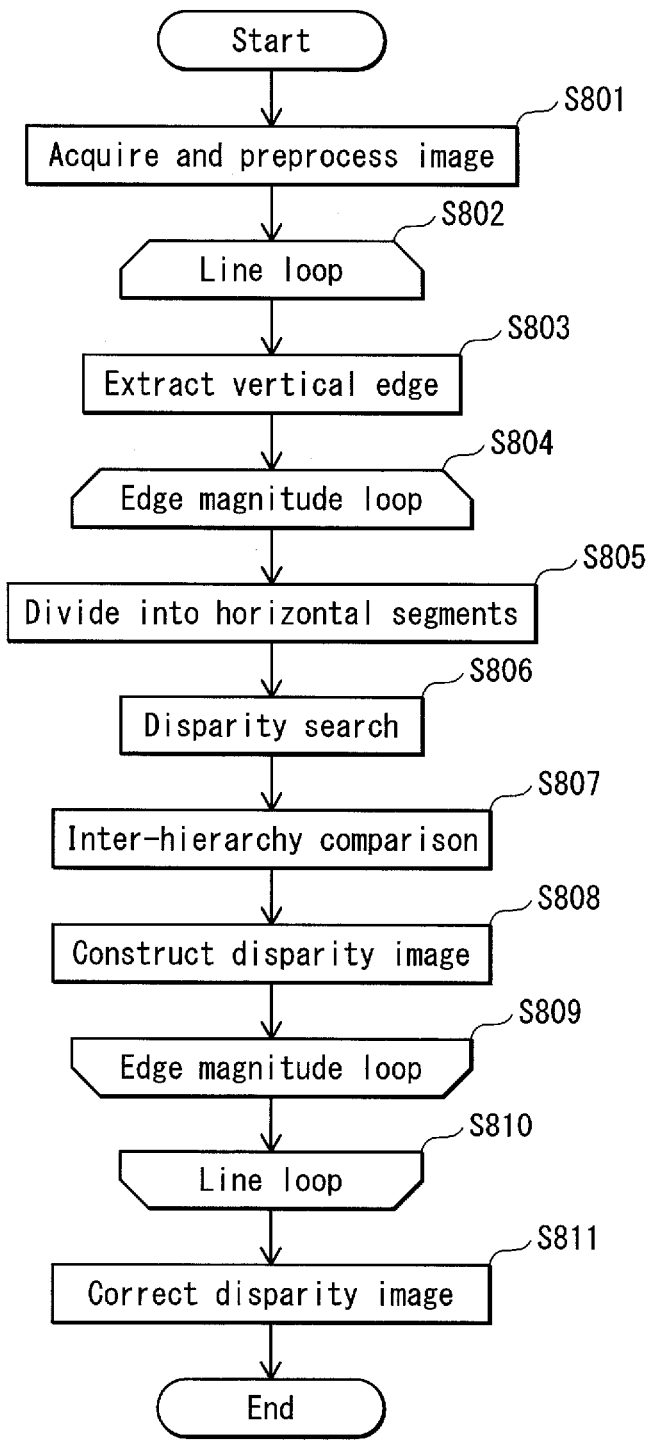
FIG. 8 is a flowchart illustrating operations by the image processing device in Embodiment 1 of the present invention.

FIG. 8 is a flowchart showing operations of the image processing device 100. As illustrated in FIG. 8, when the image processing device 100 begins processing, the cameras 110 and 111 respectively acquire the images 200 and 201, and the preprocessing units 120 and 121 respectively perform preprocessing on the images 200 and 201 (S801).

Next, the image processing device 100 determines the horizontal line that is the target of processing, and performs steps S803 through S810 on the targeted line. The image processing device 100 performs a loop to process all of the horizontal lines (S802).

The vertical edge extraction unit 130 acquires pixel values for three horizontal lines: the targeted horizontal line in the image 201, and the horizontal line on either side. The vertical edge extraction unit 130 then calculates the vertical edge magnitude for each pixel in the targeted horizontal line (S803).

The image processing device 100 selects one of the thresholds in order of size from among the predetermined plurality of thresholds for edge magnitude and then performs steps S805 through S809. The image processing device 100 performs a loop to execute processing with all of the thresholds (S804).

The horizontal segmentation unit 140 generates segment data by using the threshold selected in S804 and the vertical edge magnitude of each pixel in the targeted horizontal line, as calculated by the vertical edge extraction unit, to divide the horizontal line in the image 201 into a plurality of segments (S805).

The disparity search unit 150 generates disparity data by calculating the disparity and the similarity for each of the plurality of pieces of segment data generated by the horizontal segmentation unit 140 (S806).

The inter-hierarchy comparison unit 161 performs an inter-hierarchy comparison using the disparity data generated by the disparity search unit 150 and the disparity data stored in the disparity/similarity storage unit 162 (S807).

The disparity image construction unit 163 generates a disparity image based on the disparity data input from the inter-hierarchy comparison unit 161 (S808).

The image processing device 100 determines whether the processing in steps S805 through S808 has been performed for all the edge magnitude thresholds. If not, processing returns to step S804. Otherwise, processing proceeds to step S810 (S809).

The image processing device 100 then determines whether the processing in steps S803 through S809 have been performed for all the horizontal lines. If not, processing returns to step S802. Otherwise, processing proceeds to step S811 (S810).

The disparity image correction unit 170 generates a disparity image disparity image with the noise removed therefrom by performing noise removal on the disparity image generated by the disparity image construction unit 163.

By performing the above steps S801 through S811, the image processing device 100 generates a disparity image.

1.3 Summary

The image processing device 100 of the present embodiment divides a horizontal line into horizontal segments and performs block matching, treating the horizontal segments as blocks. By simply specifying the position and size within an image, a horizontal segment allows for simultaneous acquisition of the values of pixels belonging to a block. In other words, by performing processing line by line, the image processing device 100 prevents the block shape from becoming complex.

The image processing device 100 also generates a disparity image based on disparity calculated for each horizontal segment. Assuming that the same object has the same depth, the image processing device 100 with this structure eliminates redundant processing, allowing for calculation of image disparity with a small amount of calculation.

Furthermore, the image processing device 100 performs block matching on hierarchized horizontal segments using a plurality of thresholds. With this structure, the image processing device 100 can detect an appropriate edge in a greater number of images by using the plurality of thresholds, thus resulting in the performance of matching processing on segments divided using appropriate edges.

Moreover, the image processing device 100 performs block matching on the hierarchized horizontal segments in order from the top to the bottom level of the hierarchy, thus propagating reliability while gradually decreasing the block size. With this structure, the image processing device 100 generates a high-definition disparity image while reducing the occurrence of disparity error due to block size.

Stereo images in which the epipolar line has been rectified have no disparity in the vertical direction. Accordingly, by processing lines, the image processing device 100 can generate a high-definition disparity image without disparity error in the vertical direction.

2. Embodiment 2

As described in Embodiment 1 as well, in the disparity image generated by the disparity image generation unit 160, disparity errors occur as a horizontal segment, as illustrated in FIG. 7. In Embodiment 2, an image processing device 900 provided with a structure for more effectively removing disparity error occurring by horizontal segment is described.

2.1 Structure

Figure 9:
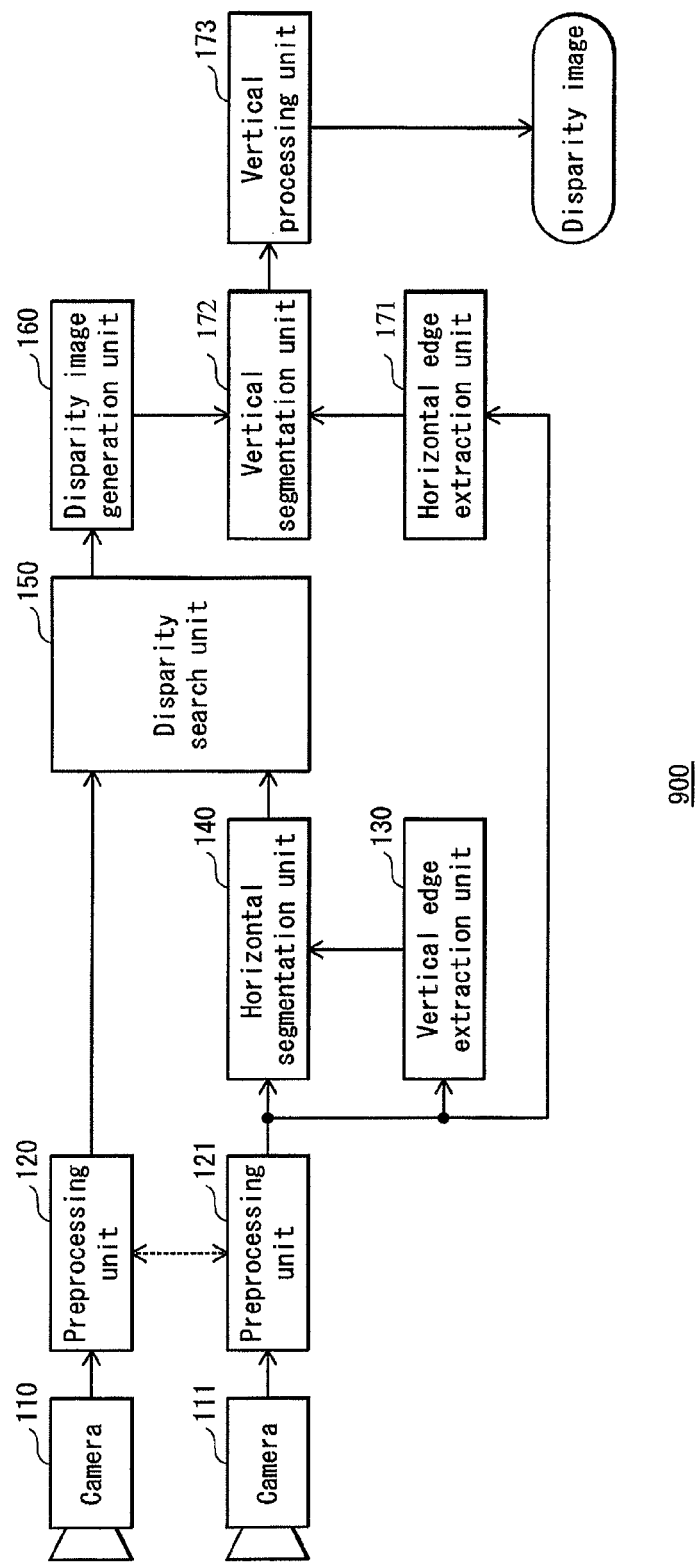
FIG. 9 illustrates an example of the functional structure of an image processing device in Embodiment 2 of the present invention.

FIG. 9 is a functional configuration diagram of an image processing device 900 according to the present embodiment. As illustrated in FIG. 9, as compared to the image processing device 100, the image processing device 900 is provided with a horizontal edge extraction unit 171, a vertical segmentation unit 172, and a vertical processing unit 173 instead of the disparity image generation unit 170.

The horizontal edge extraction unit 171 performs the same processing as the vertical edge extraction unit 130, with the horizontal and vertical directions exchanged. Specifically, the horizontal edge extraction unit 171 applies a vertical Sobel filter to the image 201, seeks the vertical brightness gradient for each pixel, and calculates the absolute value as the horizontal edge magnitude.

Like the vertical edge extraction unit 130, the horizontal edge extraction unit 171 performs thinning by detecting a vertical peak among the calculated vertical edge magnitudes, and conserving only the horizontal edge magnitude at the peak, setting all other horizontal edge magnitudes to zero.

The vertical segmentation unit 172 divides a vertical line in the disparity image generated by the disparity image generation unit 160 using the horizontal edge magnitude calculated by the horizontal edge extraction unit 171. Specifically, the vertical segmentation unit 172 divides a vertical line into a plurality of vertical segments, taking a pixel whose horizontal edge magnitude exceeds a predetermined threshold to be a border. Unlike the horizontal segmentation unit 140, the vertical segmentation unit 172 performs division using one threshold.

The vertical segmentation unit 172 generates vertical segment data and outputs the vertical segment data to the vertical processing unit 173. The vertical segment data indicates, for each vertical segment resulting from division, the following in association: the position of the segment (X coordinate and Y coordinate), the segment size, and the disparity of each pixel belonging to the segment.

In accordance with vertical segment data input from the vertical segmentation unit 172, the vertical processing unit 173 corrects the disparity image. Specifically, for each input piece of vertical segment data, the vertical processing unit 173 first calculates the median disparity value of the pixels belonging to each segment. Next, the vertical processing unit 173 corrects the disparity image by updating, to the calculated median value, the disparity of each pixel within a storage region storing the disparity of all pixels in the image. The vertical processing unit 173 updates each pixel corresponding to the position and segment size indicated by the vertical segment data.

With this structure, the image processing device 900 of the present embodiment can generate a disparity image from the image 200 and image 201 photographed by the camera 110 and the camera 111.

2.2 Operations

Figure 10:
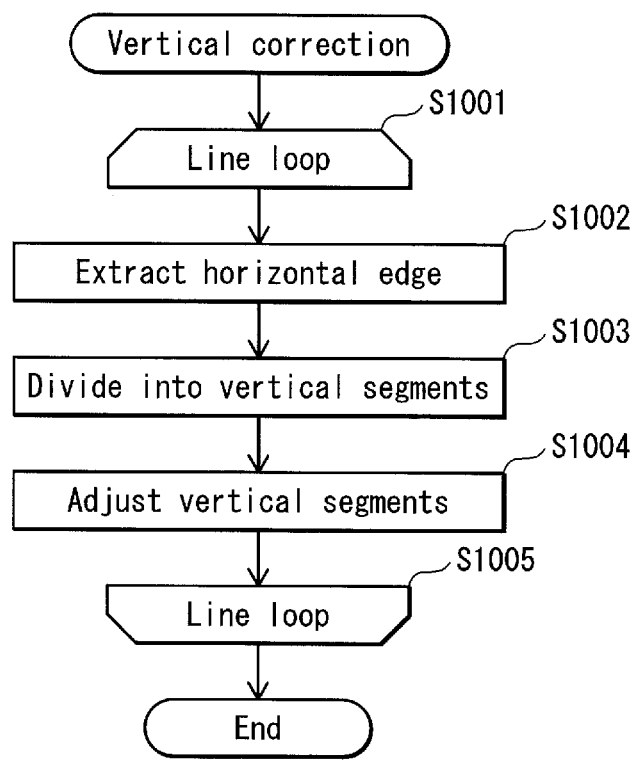
FIG. 10 is a flowchart illustrating vertical correction performed by the image processing device in Embodiment 2 of the present invention.

Next, the operations of the image processing device 900 are described. As compared to the image processing device 100, the image processing device 900 performs vertical correction as shown in the flowchart in FIG. 10 instead of the processing in step S811 performed by the disparity image correction unit 170.

Upon the start of vertical correction, the image processing device 900 determines the vertical line that is the target of processing and performs steps S1002 through S1005 on the target line. The image processing device 900 performs a loop to process all of the vertical lines (S1001).

The horizontal edge extraction unit 171 acquires pixel values for three vertical lines: the targeted vertical line in the image 201, and the vertical line on either side. The horizontal edge extraction unit 171 then calculates the horizontal edge magnitude for each pixel in the targeted vertical line (S1002).

The vertical segmentation unit 172 generates vertical segment data by using the horizontal edge magnitude of each pixel in the target vertical line, as calculated by the horizontal edge extraction unit, and a predetermined threshold to divide the target vertical line in the disparity image generated by the disparity image generation unit 160 into a plurality of segments (S1003).

Based on the vertical segment data input from the vertical segmentation unit 172, the vertical processing unit 173 corrects the disparity image (S1004).

The image processing device 900 determines whether the processing in steps S1002 through S1004 has been performed for all the vertical lines. If not, processing returns to step S1001. Otherwise, processing for vertical correction terminates (S1005).

2.3 Summary

The image processing device 900 of Embodiment 2 corrects disparity images one vertical segment at a time, the vertical segments having been divided by horizontal edges. As described above, the pixels within a segment divided by edges are highly likely to pertain to the same object. Based on the assumption that the same object has the same depth, the disparity of pixels within a vertical segment should be approximately the same value, unless a disparity error has occurred. Considering how disparity errors are characteristic, the median pixel value within a vertical segment should indicate the disparity of an object. Accordingly, the image processing device 900 can effectively remove disparity error.

3. Supplementary Explanation

While embodiments of an image processing device according to the present invention have been described, the examples of an image processing device may be modified in the following ways. The present invention is in no way limited to the image processing devices described in the above embodiments. The following describes a variety of modifications included in the concept of the present invention.

(3-1) In the above embodiments, a predetermined value is used as the threshold used in the horizontal segmentation unit 140 and the vertical segmentation unit 172, but the threshold is not limited in this way. For example, a value input by the user of the image processing device in response to the calculated vertical edge magnitude and horizontal edge magnitude may be used. Furthermore, the image processing device 100 and image processing device 900 may include a new structural element: a threshold setting unit that calculates the threshold for identifying a specific proportion of vertical edge magnitudes from a distribution of vertical edge magnitudes calculated by the vertical edge extraction unit 130. For example, for a particular horizontal line, if 10 thinned edges are detected, and 30% of the edges are to be identified, the edge magnitude would be set to a value between the third and the fourth edge magnitude in the order of edge magnitudes.

(3-2) In the above embodiments, the search range used by the disparity search unit 150 to calculate the disparity of a horizontal segment is determined in advance, but the search range is not limited in this way.

During matching processing, calculating the similarity for all regions along a horizontal line in the image 200 requires an enormous amount of calculation. Therefore, a search range is normally set. As another embodiment, however, instead of setting a search range, similarity may be calculated for all of the regions along the horizontal line in the image 200 in accordance with hardware processing capability.

Furthermore, the search range normally uses the disparity amount of zero as a reference disparity, searching over a predetermined range in a direction in which disparity occurs (the directions differ between crossed disparity and uncrossed disparity). As another embodiment, however, a new structural element may be provided: a search range setting unit that sets the reference disparity to be the disparity calculated at the next higher level of the hierarchy, for example, and sets the search range to be a predetermined range centered on the reference disparity.

(3-3) In the above embodiments, the vertical edge extraction unit 130 uses a horizontal Sobel filter as the filter for extracting vertical edges, but the filter is not limited in this way. It suffices for the filter for extracting vertical edges to be able to calculate the horizontal brightness gradient. For example, the filters indicated by labels 1101, 1102, 1103, and 1104 in FIG. 11 may be used. In particular, filters 1102, 1103, and 1104 allow for calculation of the brightness gradient using only pixel values in the target horizontal line.

(3-4) In the above embodiments, SAD is used for calculation of similarity during block matching, but block matching is not limited in this way. During block matching, SSD (Sum of Squared Differences) and NCC (Normalized Cross Correlation), for example, are often used to calculate similarity, and these may be used in another embodiment.

SSD is yielded by Equation 4 below, for example.

$$SSD_i(d) = \sum_{j=x_i}^{x_i+N-1} (I_L(j, y_i) - I_R(j+d, y_i))^2 \qquad \text{Equation 4}$$

NCC, on the other hand, is for example yielded by Equation 5 below.

$$NCC_i(d) = \frac{\sum_{j=x_i}^{x_i+N-1} I_L(j, y_i) I_R(j+d, y_i)}{\sqrt{\sum_{j=x_i}^{x_i+N-1} I_L(j, y_i)^2 \sum_{j=x_i}^{x_i+N-1} I_R(j+d, y_i)^2}} \qquad \text{Equation 5}$$

Note that with NCC, similarity is greater for a higher value, and the value does not depend on segment size. This value can therefore be used as the similarity $S_i$.

(3-5) In the above embodiments, a median filter is used as the noise removal filter, but the noise removal filter is not limited in this way. For example, it is possible to use a mean filter that considers the pixel value of the target pixel to be the mean of the pixel values of the target pixel and neighboring pixels.

(3-6) The above embodiments and modifications may be partially combined.

(3-7) A control program composed of program code, in machine language or a high-level language, for causing a processor in an image processing device and circuits connected to the processor to execute the processing shown in the above embodiments may be recorded on recording media or circulated and distributed over a variety of communications channels or the like. Such recording media include IC cards, hard disks, optical discs, flexible disks, ROM, flash memory, and the like. The control program that is circulated and distributed is used by being stored on a processor-readable memory or the like. The functions indicated in the embodiments are achieved by the processor executing the control program. Note that instead of directly executing the control program, the processor may compile the control program before execution or execute the control program with an interpreter.

(3-8) The functional structural elements in the embodiments and modifications may be implemented as circuits that perform the functions, or implemented by one or more processors executing a program. The functional blocks of an image processing device are typically implemented as an LSI, which is an integrated circuit. These functional blocks may respectively be formed as discrete chips, or part or all may be integrated into one chip. Although referred to here as an LSI, depending on the degree of integration, the terms IC, system LSI, super LSI, and ultra LSI are also used. In addition, the method for assembling integrated circuits is not limited to LSI, and a dedicated communication circuit or a general-purpose processor may be used. A Field Programmable Gate Array (FPGA), which is programmable after the LSI is manufactured, or a reconfigurable processor, which allows reconfiguration of the connection and setting of circuit cells inside the LSI, may be used.

4. Supplementary Explanation 2

The following describes the structure, modifications to, and effects of a communications server as a further embodiment of the present invention.

(A) An image processing device according to an embodiment of the present invention is an image processing device for generating a disparity image from a first image and a second image, comprising: a vertical edge extraction unit configured to calculate a vertical edge component of each pixel in the first image; a horizontal segmentation unit configured to divide a horizontal line in the first image into a plurality of segments using, as a border between each of the segments, a pixel for which the vertical edge component has a magnitude exceeding a predetermined threshold; a disparity calculation unit configured to calculate a disparity between each of the segments and a region of the second image similar to the segment; and a disparity image generation unit configured to generate the disparity image in accordance with the disparity calculated for each of the segments.

By performing processing line by line, this structure prevents the block shape from becoming complex due to division along edges, thereby controlling an increase in the amount of calculation. Furthermore, performing processing line by line allows for generation of a high-definition disparity image without the occurrence of disparity error in the vertical direction.

Moreover, generating the disparity image in accordance with the disparity calculated for each of the segments greatly reduces the amount of calculation.

(B) In embodiment A of the image processing device, the disparity calculation unit may calculate, for each of the segments, the disparity between the segment and a region most similar to the segment within a predetermined search range.

This structure allows for calculation of similarity in a search range that is suited to the processing capability of the hardware.

(C) In embodiment B of the image processing device, the horizontal segmentation unit may divide the horizontal line using the predetermined threshold by dividing the horizontal line into a plurality of first segments using a first threshold and by dividing the horizontal line into a plurality of second segments using a second threshold smaller than the first threshold. The disparity calculation unit may calculate, for each of the first segments and each of the second segments, the disparity and a similarly between the segment and a region most similar to the segment within the predetermined search range. The disparity image generation unit may compare, in an overlapping region between one of the first segments and one of the second segments, the similarity calculated for the first segment and the similarity calculated for the second segment and set the disparity of the overlapping region to be the disparity calculated for the segment with greater similarity.

With this structure, using a plurality of thresholds allows for division of a horizontal line using appropriate edges. Furthermore, hierarchizing the segments using a plurality of thresholds and comparing the similarity between segments at higher and lower hierarchical levels allows for generation of a high-definition disparity image while reducing the occurrence of disparity error due to block size.

(D) Embodiment C of the image processing device may further comprise a search range setting unit configured to set the search range for the second segment using the disparity calculated for the first segment.

This structure allows for calculation of disparity while propagating, to a lower hierarchical level, information on a segment calculated at a higher hierarchical level.

(E) Embodiment A of the image processing device may further comprise a threshold setting unit configured to set the threshold in accordance with a distribution of the magnitude of each vertical edge component.

This structure sets the threshold in accordance with a distribution of the edge magnitude of the vertical edges calculated for an image, thereby allowing for setting of the threshold to identify edges as appropriate for each image.

(F) Embodiment A of the image processing device may further comprise a correction unit configured to correct the disparity image using a noise removal filter that is longer vertically than horizontally.

This structure allows for effective removal of disparity error over horizontally long segments.

(G) In embodiment A of the image processing device, the predetermined threshold may be a vertical edge threshold, and each segment may be a horizontal segment. The image processing device may further comprise: a horizontal edge extraction unit configured to calculate a horizontal edge component of each pixel in the first image: a vertical segmentation unit configured to divide a vertical line in the disparity image into a plurality of vertical segments using, as a border between each of the vertical segments, a pixel for which the horizontal edge component has a magnitude exceeding a horizontal edge threshold; and a vertical processing unit configured to perform noise removal on each of the vertical segments.

This structure allows for effective removal of disparity error over horizontally long segments.

Industrial Applicability

The present invention is useful not only in a digital camera or the like that can photograph stereo images, but also as a disparity image generation device that generates a disparity image extracted from input of stereo images. The present invention may also be used in surveillance or the like in association with recognition technology.

| Reference Signs List | |
|---|---|
| 100, 900 | image processing device |
| 110, 111 | camera |
| 120, 121 | preprocessing unit |
| 130 | vertical edge extraction unit |
| 140 | horizontal segmentation unit |
| 150 | disparity search unit |
| 160 | disparity image generation unit |
| 161 | inter-hierarchy comparison unit |
| 162 | disparity/similarity storage unit |
| 163 | disparity image construction unit |
| 170 | disparity image correction unit |
| 171 | horizontal edge extraction unit |

-continued

Reference Signs List

| 172 | vertical segmentation unit |
| 173 | vertical processing unit |

The invention claimed is:

1. An image processing device for generating a disparity image from a first image and a second image, comprising:
a memory and a processor, wherein
the processor executes a program stored in the memory so as to:
calculate a vertical edge component of each pixel in the first image;
divide a horizontal line in the first image into a plurality of segments using, as a border between each of the segments, a pixel for which the vertical edge component has a magnitude exceeding a predetermined threshold;
calculate a disparity between each of the segments and a region of the second image similar to the segment; and
generate the disparity image in accordance with the disparity calculated for each of the segments.

2. The image processing device of claim 1, wherein the processor executes the program in the memory so as to:
calculate, for each of the segments, the disparity between the segment and a region most similar to the segment within a predetermined search range.

3. The image processing device of claim 2, wherein the processor executes the program in the memory so as to:
divide the horizontal line using the predetermined threshold by dividing the horizontal line into a plurality of first segments using a first threshold and by dividing the horizontal line into a plurality of second segments using a second threshold smaller than the first threshold,
calculate, for each of the first segments and each of the second segments, the disparity and a similarly between the segment and a region most similar to the segment within the predetermined search range, and
compare, in an overlapping region between one of the first segments and one of the second segments, the similarity calculated for the first segment and the similarity calculated for the second segment, and set the disparity of the overlapping region to be the disparity calculated for the segment with greater similarity.

4. The image processing device of claim 3, the processor executes the program in the memory so as to:
set the search range for the second segment using the disparity calculated for the first segment.

5. The image processing device of claim 1, the processor executes the program in the memory so as to:
set the threshold in accordance with a distribution of the magnitude of each vertical edge component.

6. The image processing device of claim 1, the processor executes the program in the memory so as to:
correct the disparity image using a noise removal filter that is longer vertically than horizontally.

7. The image processing device of claim 1, wherein
the predetermined threshold is a vertical edge threshold, and each segment is a horizontal segment,
the processor executes the program in the memory so as to:
calculate a horizontal edge component of each pixel in the first image;
divide a vertical line in the disparity image into a plurality of vertical segments using, as a border between each of the vertical segments, a pixel for which the horizontal edge component has a magnitude exceeding a horizontal edge threshold; and
perform noise removal on each of the vertical segments.

8. An image processing method for generating a disparity image from a first image and a second image, comprising the steps of:
calculating a vertical edge component of each pixel in the first image;
dividing a horizontal line in the first image into a plurality of segments using, as a border between each of the segments, a pixel for which the vertical edge component has a magnitude exceeding a predetermined threshold;
calculating a disparity between each of the segments and a region of the second image similar to the segment; and
generating the disparity image in accordance with the disparity calculated for each of the segments.

9. A program, recorded on a computer-readable non-transitory recording medium, executing disparity image generation processing for generating a disparity image from a first image and a second image, the disparity image generation processing comprising the steps of:
calculating a vertical edge component of each pixel in the first image;
dividing a horizontal line in the first image into a plurality of segments using, as a border between each of the segments, a pixel for which the vertical edge component has a magnitude exceeding a predetermined threshold;
calculating a disparity between each of the segments and a region of the second image similar to the segment; and
generating the disparity image in accordance with the disparity calculated for each of the segments.

10. An integrated circuit used in an image processing device for generating a disparity image from a first image and a second image, the integrated circuit comprising:
a vertical edge extraction circuit configured to calculate a vertical edge component of each pixel in the first image;
a horizontal segmentation circuit configured to divide a horizontal line in the first image into a plurality of segments using, as a border between each of the segments, a pixel for which the vertical edge component has a magnitude exceeding a predetermined threshold;
a disparity calculation circuit configured to calculate a disparity between each of the segments and a region of the second image similar to the segment; and
a disparity image generation circuit configured to generate the disparity image in accordance with the disparity calculated for each of the segments.

* * * * *